(12) United States Patent
Harada et al.

(10) Patent No.: US 8,665,223 B2
(45) Date of Patent: Mar. 4, 2014

(54) DISPLAY DEVICE AND METHOD PROVIDING DISPLAY CONTACT INFORMATION BASED ON AN AMOUNT OF RECEIVED LIGHT

(75) Inventors: Tsutomu Harada, Kanagawa (JP); Kazunori Yamaguchi, Kanagawa (JP); Hirotoshi Fujisawa, Kanagawa (JP)

(73) Assignee: Japan Display West, Inc., Chita (JP)

( * ) Notice: Subject to any disclaimer, the term of this patent is extended or adjusted under 35 U.S.C. 154(b) by 578 days.

(21) Appl. No.: 11/388,475

(22) Filed: Mar. 24, 2006

(65) Prior Publication Data

US 2006/0214892 A1    Sep. 28, 2006

(30) Foreign Application Priority Data

Mar. 28, 2005   (JP) .................................. 2005-092154

(51) Int. Cl.
  *G06F 3/041*           (2006.01)
(52) U.S. Cl.
  USPC .......................................................... 345/173
(58) Field of Classification Search
  USPC ................. 345/173–178, 204–215, 690–699, 345/87–111
  See application file for complete search history.

(56) References Cited

U.S. PATENT DOCUMENTS

| | | | |
|---|---|---|---|
| 2002/0079512 A1* | 6/2002 | Yamazaki et al. | 257/200 |
| 2003/0156100 A1* | 8/2003 | Gettemy | 345/204 |
| 2003/0179323 A1* | 9/2003 | Abileah et al. | 349/24 |
| 2004/0125053 A1* | 7/2004 | Fujisawa | 345/76 |
| 2005/0093851 A1* | 5/2005 | Nakamura et al. | 345/204 |
| 2005/0200293 A1* | 9/2005 | Naugler et al. | 315/149 |
| 2006/0007170 A1* | 1/2006 | Wilson et al. | 345/173 |
| 2006/0091288 A1* | 5/2006 | Keam et al. | 250/208.1 |
| 2006/0192766 A1* | 8/2006 | Nakamura et al. | 345/173 |

FOREIGN PATENT DOCUMENTS

| | | |
|---|---|---|
| JP | 07-182101 | 7/1995 |
| JP | 09-198001 | 7/1997 |
| JP | 11-075115 | 3/1999 |
| JP | 2001-345998 | 12/2001 |
| JP | 2004-127272 | 4/2004 |
| JP | 2004-318819 | 11/2004 |
| WO | WO 2004/088496 | * 10/2004 |
| WO | WO 2004-098175 | 11/2004 |

* cited by examiner

*Primary Examiner* — Chanh Nguyen
*Assistant Examiner* — Long D Pham
(74) *Attorney, Agent, or Firm* — Robert J. Depke; The Chicago Technology Law Group, LLC

(57) ABSTRACT

A display device and a display method are provided in which the influence of the outside light can be removed easily, in the case where light-emitting and light-receiving are performed in parallel and simultaneously.
In the case where an image-display and a light-receiving are performed simultaneously or alternately on a display surface of the display device, processing of making the display surface emit light to display an image is performed; light entering the display surface is received, which is the light-receiving of two times of a state in which the light-emitting for display use is being performed (step S11) and of a state in which light is not emitted (step S12); and a state in which the display surface is touched or approached is detected based on the detection of a difference in the quantities of received light of the two times (step S13).

6 Claims, 17 Drawing Sheets

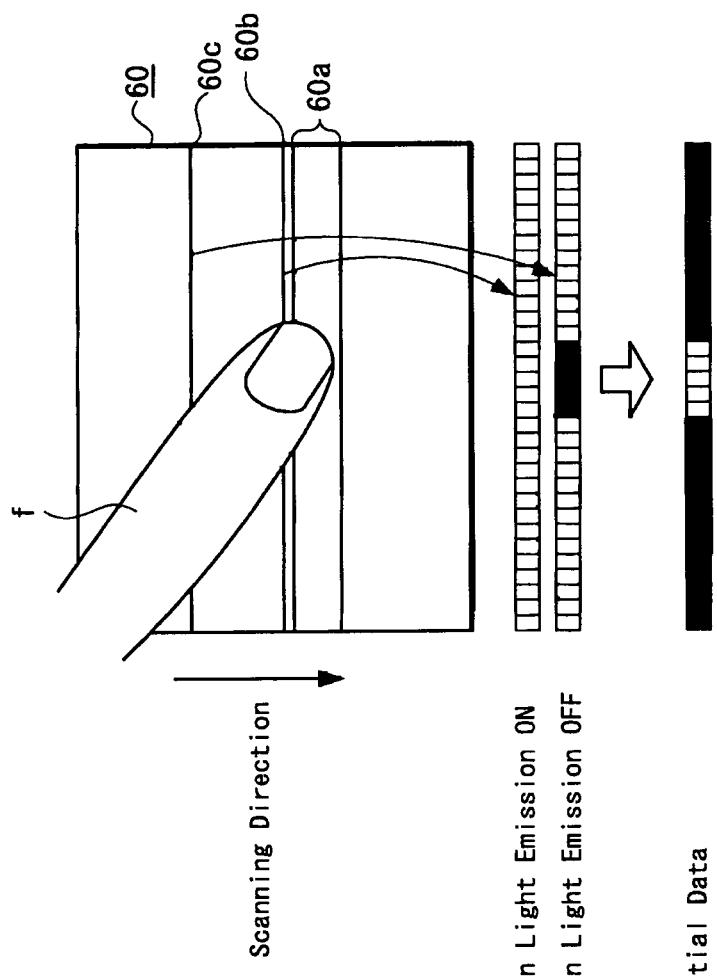

DISPLAY DEVICE AND METHOD PROVIDING DISPLAY CONTACT INFORMATION BASED ON AN AMOUNT OF RECEIVED LIGHT

CROSS REFERENCES TO RELATED APPLICATIONS

The present invention contains subject matter related to Japanese Patent Application JP 2005-092154 filed in the Japanese Patent Office on Mar. 28, 2005, the entire contents of which being incorporated herein by reference.

BACKGROUND OF THE INVENTION

1. Field of the Invention

The present invention relates to a display device and display method suitably applied to, for example, a liquid crystal display, an organic EL (Electro-Luminance) display and the like, and particularly to a display technology capable of receiving light in parallel with emitting light.

2. Description of the Related Art

In related art, in the case where on a display screen of a display device such as a television receiver a touch panel capable of being operated when touching the screen is configured, the touch panel provided separately from the display device is superimposed on the display screen.

As a configuration that uses the touch panel separately provided, for example, there is the one in which a thin transparent input detecting device is attached on the screen. This is a touch sensor using a conductive film, and there are a pressure type that detects the pressure, a static capacity type whose static capacity is changed when a human body is touched and the like. Further, there is an electromagnetic induction type that uses a specific pen to input a position. Those types have a structure in which a specific position-detecting panel is superimposed on the surface of a display panel.

Although the above types that use the detecting panel superimposed on the display panel use a simple principle of detecting touch, the deterioration of the display quality occurs inevitably, because some material is superimposed on the display panel. Furthermore, since a method of mainly detecting the capacity change is employed, it is difficult to detect inputs to two or more positions simultaneously.

Also, as a method of a touch panel in which a panel is not attached to the surface, there is an optical type. In this touch panel method, light-emitting elements (light-emitting diodes) and phototransistors are combined and disposed on the left, right, top and bottom of a panel, and light is shielded by the finger and the like to detect the position. The deterioration of the display quality does not occur in this optical type, but a device installed in the surrounding area of the display device becomes large, which is not suitable for portable equipment.

Recently, in order to solve the inconvenience of those touch panels in related art, the one is proposed in which the screen itself of the display device functions as the touch panel without separately providing the touch panel. Patent document 1 discloses such display device that emits light and receives light in parallel.

In the display device that emits light and receives light in parallel, for example, the display (light-emitting) by an image display light-emitting element arranged on a display screen is performed intermittently, and electric charge corresponding to the received light is stored in the light-emitting element itself, and then the electric charge stored is read out. As a display device in which such configuration is possible, there is an organic EL display, for example. Furthermore, in the case where a display pixel does not have a function of receiving light (storing electric charge), such as an LCD (Liquid Crystal Display) device, it is proposed a structure in which a light-receiving element is disposed adjacently to the display pixel and the light is received by the light-receiving element during the pause of the display (light-emitting).

Patent document 1: Japanese Published Patent Application No. 2004-127272 (refer to FIG. 5)

SUMMARY OF THE INVENTION

In the case where this kind of display device that emits light and receives light simultaneously is configured, there is recognized a problem that the state of a signal when light is received considerably fluctuates due to the influence of outside light. In other words, for example, when it is assumed that on the display screen a position touched with the finger or the like is detected, the light-receiving conditions are largely different between the case where the light-receiving is detected in a dark room and the case where the light-receiving is detected outdoors in bright daylight, and therefore it is difficult to detect the touch or the like to the surface of the display device under the uniform light-receiving conditions.

Accordingly, when the above-described display device is applied to equipment capable of being used both outdoors and indoors, for example, as a display panel for a portable electronic apparatus, some treatment corresponding to the change in the strength of outside light is required, however, it is difficult to perform such treatment easily with the display device proposed in the past that emits light and receives light simultaneously.

In view of the above, it is desirable that the influence of outside light is easily removed in the case where the light-emitting and the light-receiving are performed in parallel simultaneously.

A display device according to an embodiment of the present invention is the one in which in the case where an image is displayed and light is received simultaneously or alternately on the display surface thereof, processing of making the display surface emit light to display an image is performed and light entering the display surface is received, where the light-receiving is performed two times in a state in which light is emitted for display use and in a state in which light is not emitted, and the state touched or approached to the display surface is detected from a difference in the quantities of received light of the two times.

With the above configuration, for example, in the state in which the display surface is made to emit the light, the quantity of received light detected by the elements at the position touched on the display surface becomes an approximately constant regardless of the presence or absence of outside light, because the touched object itself interrupts the outside light, even if the outside light exists. In addition, since the quantity of received light detected by elements in other positions changes from the constant quantity of received light, the state in which the corresponding position was touched can be determined in the case where the difference in the quantities of received light of two times is a predetermined level or more. A state of being approached to the display surface can also be determined similarly.

According to the embodiment of the present invention, a state in which the corresponding position was touched (or approached) can be determined in the case where the difference in the quantities of received light of two times is a predetermined level or more, and the touch or approach can

BRIEF DESCRIPTION OF THE DRAWINGS

FIGS. 20A to 20D are explanatory diagrams showing an example of drive timing according to the second embodiment of the present invention.

DESCRIPTION OF THE PREFERRED EMBODIMENTS

Hereinafter, a first embodiment of the present invention is explained with reference to FIGS. 1 through 17.

In this embodiment, the present invention is applied to a display device configured as an LCD (Liquid Crystal Display), in which a light-receiving element is disposed adjacently to each of light-emitting elements constituting the LCD display and so light-emitting (display) and light-receiving (readout) can be performed in parallel. Here, a display in this embodiment in which the light-emitting and light-receiving can be performed in parallel is called an I/O display, because it is a display in which an input (light-receiving) and output (display) of an image can be performed simultaneously. Further, as described later on, the I/O display in this embodiment can detect not only a touch that is a state of the screen being touched, but also an object approached to the screen, and when described as "the detection of touch" in the later explanation, except that a particular explanation is given, "the detection of approach" is also included.

Figure 1:
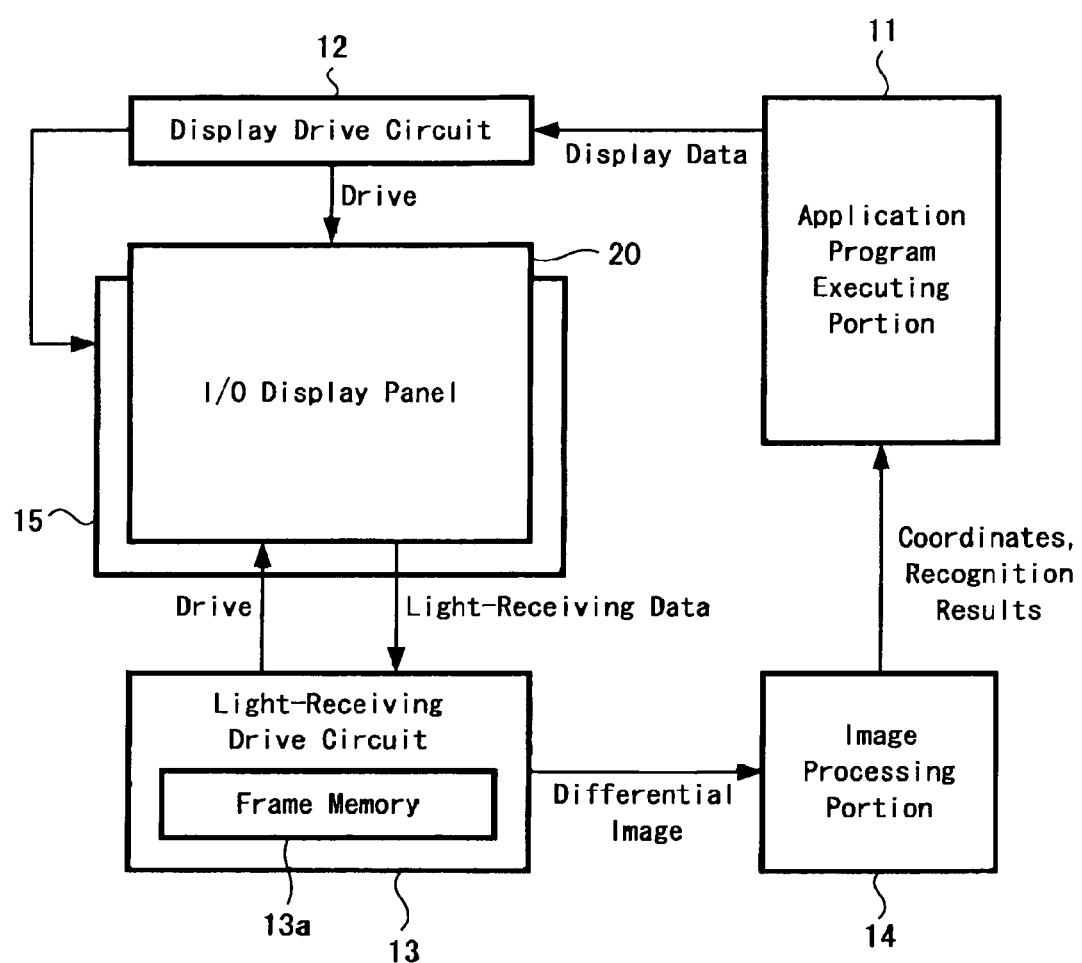
FIG. 1 is a block diagram showing an example of a configuration of a display device according to a first embodiment of the present invention.

FIG. 1 is a block diagram showing an example of a configuration of the display device of this embodiment. An application program executing portion 11 performs processing of displaying an image corresponding to an application being executed therein, and detects a touch to a display panel to perform processing and the like according to the display position touched. An instruction from the application program executing portion 11 to display the image is sent to a display drive circuit 12, and an I/O display panel 20 is driven to display the image.

The I/O display panel 20 is configured as an LCD display, in which transparent electrodes and the like are arranged on a transparent substrate such as a glass substrate and a plurality of pixels (display elements) are formed on a display area (sensor area) 21 in the matrix shape, and a backlight 15 is arranged in the back. The backlight 15 of this embodiment includes a plurality of light-emitting diodes arranged, for example, and on/off control of illumination of the backlight can be performed at a comparatively high speed. The on/off control in the illumination of the backlight 15 is performed in synchronization with the display drive in the display drive circuit 12.

In the I/O display panel 20, a plurality of light-receiving elements are arranged separately from the display elements. Specifically, for example, the light-receiving elements are arranged in a matrix shape adjacently to each of display pixels in the display area (sensor area) 21, and signal electric charge stored correspondingly to the quantity of light received by the light-receiving element is read out with the drive from a light-receiving drive circuit 13. The light-receiving drive circuit 13 includes a frame memory 13a therein, which is used for the necessary determination processing when reading out the light-receiving signal described later on.

The light-receiving signal (differential image signal described later on) read out and determined in the light-receiving drive circuit 13 is sent to an image processing portion 14 and the state of touch and the like are determined as an image, a coordinate position of the center of touch and the like are determined if necessary, and the determination results (coordinate data, recognition result and the like) are sent to the application program executing portion 11. In the application program executing portion 11, the processing corresponding to the application being in execution is performed. For example, processing of displaying the position, range and the like where the touch was detected is performed while displaying the image.

Figure 2:
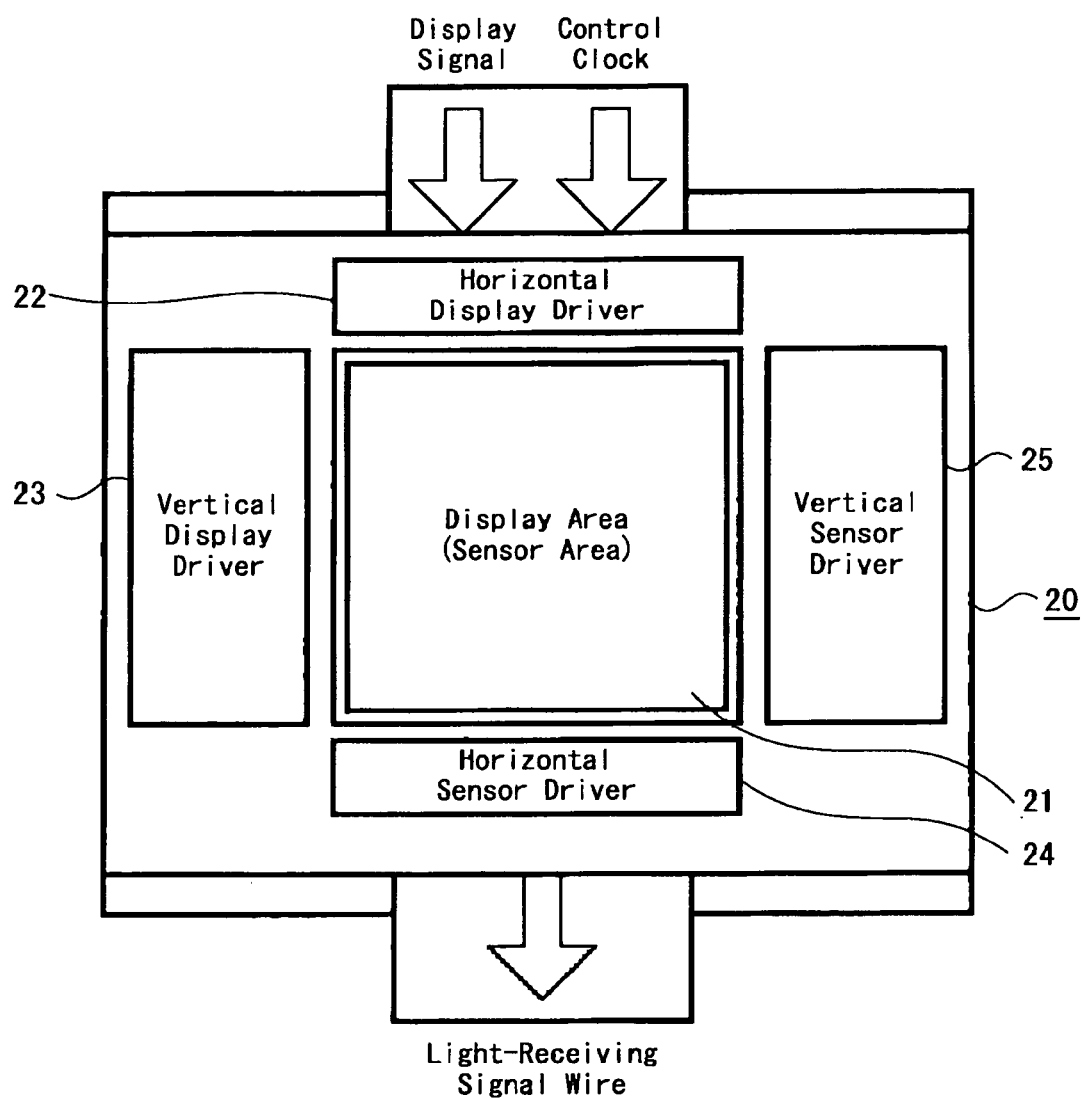
FIG. 2 is a constitutional diagram showing an example of a display panel according to the first embodiment of the present invention.

Next, an example of arrangement of a driver in the I/O display panel 20 of this embodiment is explained with reference to FIG. 2. In the I/O display panel 20 where the transparent display area (sensor area) 21 is arranged in the center, a horizontal display driver 22, a vertical display driver 23, a horizontal sensor driver 24 and a vertical sensor driver 25 are arranged on four sides of the display area 21, as shown in FIG. 2. A display signal and a control clock are supplied as display data to the horizontal display driver 22 and the vertical display driver 23, and the display pixels arranged in the display area 21 in the matrix shape are driven. A readout clock signal is supplied to the horizontal sensor driver 24 and the vertical sensor driver 25, and a light-receiving signal read out in synchronization with the clock signal is supplied to the light-receiving drive circuit 13 through the light-receiving signal wires.

Figure 3:
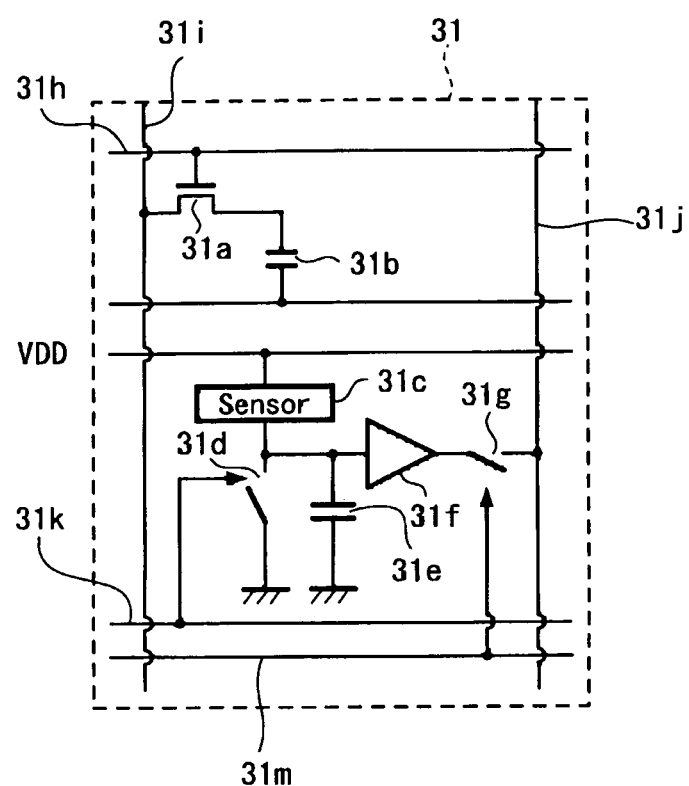
FIG. 3 is a connection diagram showing an example of a configuration of a pixel according to the first embodiment of the present invention.

FIG. 3 is a diagram showing a configuration of one pixel arranged in the display area 21. A pixel 31 includes for display: a gate electrode 31h arranged in the horizontal direction, a drain electrode 31i arranged in the vertical direction, and a switching element 31a arranged at an intersection of both the electrodes, where switching element 31a and a pixel electrode 31b are connected. Regarding the switching element 31a, the on/off state is controlled by the signal obtained through the gate electrode 31h, and the display state in the pixel electrode 31b is set by the signal supplied through the gate electrode 31i.

Further, a light-receiving sensor (light-receiving element) 31c is arranged at the position adjacent to the pixel electrode 31b, and power supply voltage VDD is supplied thereto. A reset switch 31d and a capacitor 31e are connected to the light-receiving sensor (light-receiving element) 31c and the electric charge corresponding to the quantity of received light is stored in the capacitor 31e while being reset by the reset switch 31d. The electric charge stored is supplied to a signal output electrode 31j through a buffer amplifier 31f at the timing in which a readout switch 31g becomes "ON" and is output to the outside. The on/off of the reset switch 31d is controlled by the signal obtained at a reset electrode 31k and the on/off of the readout switch 31g is controlled by the signal obtained in a readout control electrode 31m.

Figure 4:
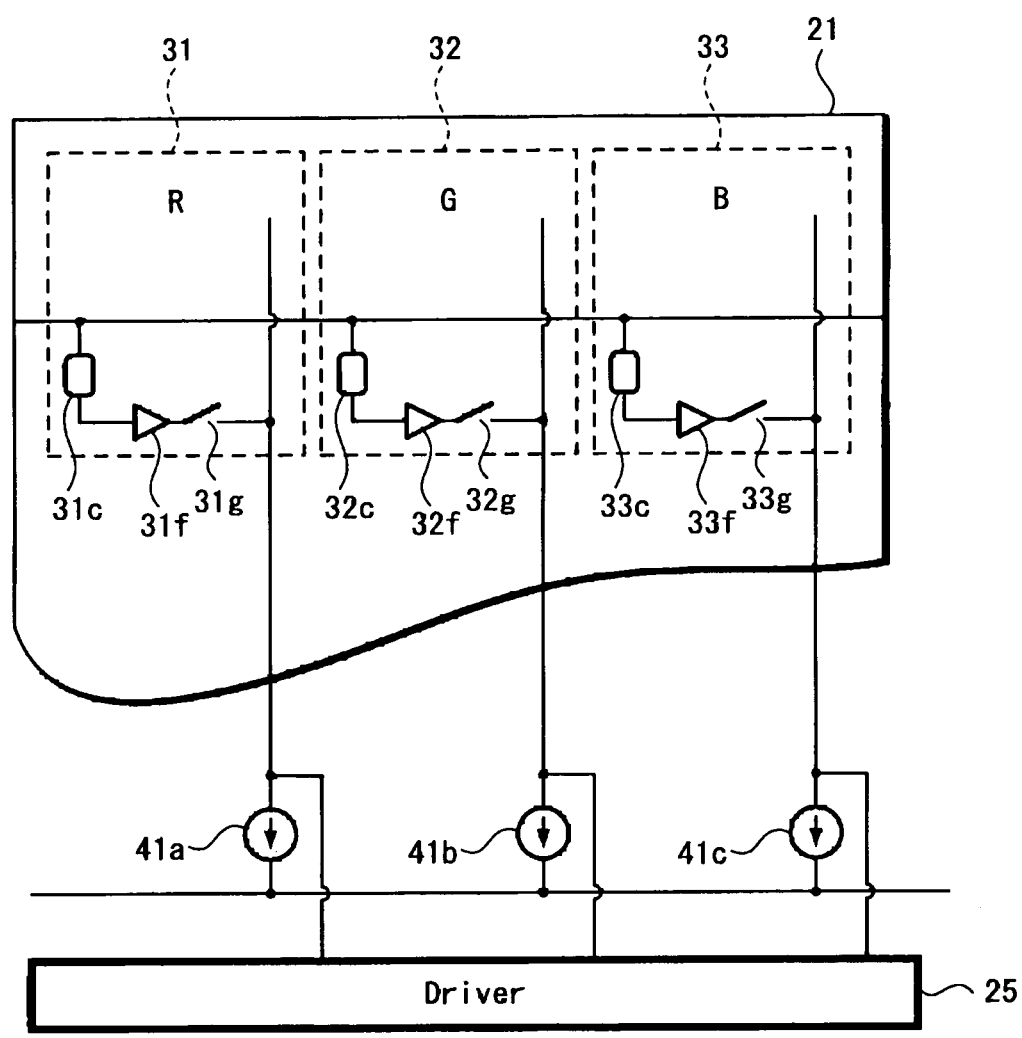
FIG. 4 is a connection diagram showing an example of a readout configuration from the pixels according to the first embodiment of the present invention.

FIG. 4 is a diagram showing a configuration in which the signal read out from the light-receiving sensor is supplied to the sensor driver 25. FIG. 4 shows three pixels 31, 32, 33 of red (R), green (G) and blue (B) adjacently disposed. The electric charge stored in the capacitor connected to the light-receiving sensors 31c, 32c, 33c of respective pixels is amplified in buffer amplifiers 31f, 32f, 33f and is supplied to the driver 25 through the signal output electrode at the timing in which the readout switches 31g, 32g, 33g become "ON". In addition, constant current supply sources 41a, 41b, 41c are connected to the signal output electrodes respectively, and the signal corresponding to the quantity of received light can be detected by the driver 25 with high sensitivity.

Figure 5:
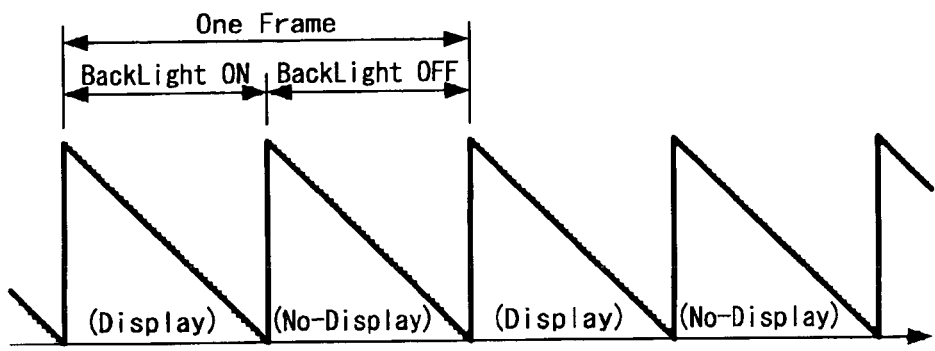
FIG. 5 is a timing diagram showing an example of ON/OFF timing of a backlight according to the first embodiment of the present invention.

FIG. 5 is a diagram showing the display state and light-receiving state in the I/O display panel 20 of this embodiment. For example, as shown in FIG. 5, assuming that the display of an image (moving image or still image) is performed at a frame cycle of 1/60 sec, each frame cycle is divided in two, and the backlight 15 is turned on in the first half (1/120 sec) and the display signal is input into each display pixel and the image in that frame cycle is displayed. Then, the backlight 15 is turned off in the last half in which the display is not performed.

For each frame cycle, readout of the signal received by the light-receiving elements is performed one time in the first half period in which the backlight is "ON" and is further performed one time in the last half period in which the backlight is "OFF". Although it is necessary that the display of the image signal is performed for each frame at the frame cycle, the readout of the light-receiving signal is not necessarily performed for each frame cycle, and may not be performed for each frame cycle.

Next, the processing performed after reading out the light-receiving signal as described above is explained with reference to a flow chart of FIG. 6. In this embodiment, as already explained with reference to FIG. 5, the readout of the light-receiving signal is performed two times in one frame period. Specifically, readout is performed when light emission (backlight) is "ON" (step S11) and is also performed when the light emission (backlight) is "OFF" (step S12). Each signal read out is temporarily stored in the frame memory 13a (shown in FIG. 1) in the light-receiving drive circuit 13 and the processing of detecting the difference in the two light-receiving signals for each pixel unit is performed in the light-receiving drive circuit 13 (step S13).

The detected differential signal is sent to the image processing portion 14 as a differential image for one frame unit. In the image processing portion 14, the processing in which the supplied differential image is binarized into a predetermined level or more and less than the predetermined level is performed for each pixel unit (step S14). Further, computation to determine the center of gravity of a detected area being the predetermined level or more as a result of binarization is performed (step S15), and a coordinate position of the center of gravity determined (a coordinate position on the display area 21) is sent to the application program executing portion 11. In the application program executing portion 11, the supplied coordinate position of the center of gravity is specified as the center position of an object touched or approached (step S16).

Figure 7:
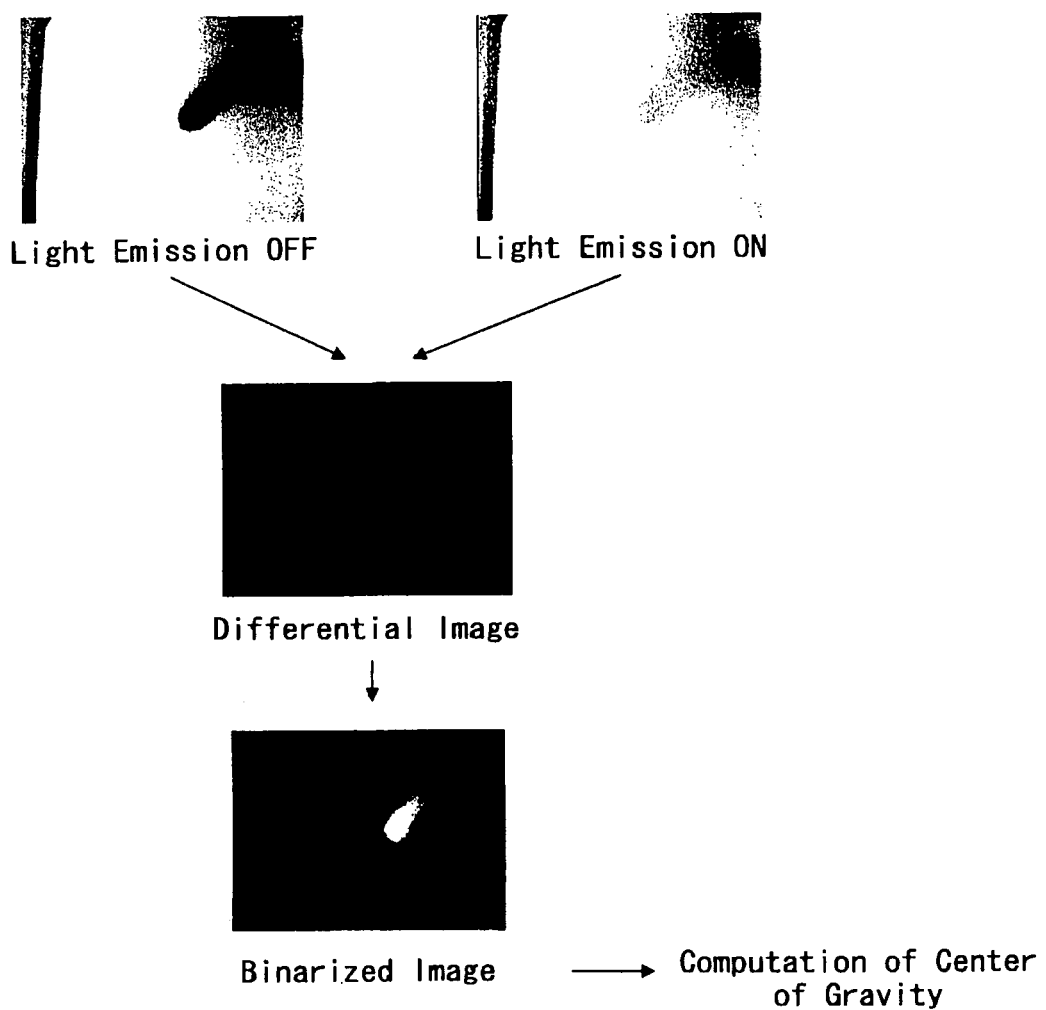
FIG. 7 is an explanatory diagram showing an example of the detected images according to the first embodiment of the present invention.

FIG. 7 shows an example of the state in which an object (finger) touched or approached to a display surface of the I/O display panel 20 is detected. The picture of the example of FIG. 7 shows the image of the case in which the display surface of the I/O display panel 20 is touched with a finger. As shown in the upper right and left of FIG. 7, it is assumed that an image according to the quantity of received light read out in the state where the light emission is "ON" (on the right side) and an image according to the quantity of received light read out in the state where the light emission is "OFF" (on the left side) were obtained. At this time, as shown in the middle of FIG. 7, a differential image of both the light-receiving images is obtained. The differential image is an image with which the touched state or approached state can be detected without being affected by the brightness of outside light, as described later on. Then, the differential image is binarized to obtain a binary image in which the range touched is detected, as shown at the bottom in FIG. 7. Further, a position touched with a finger can be specified by detecting a center of gravity of the touched range in the binary image.

Figure 8A:
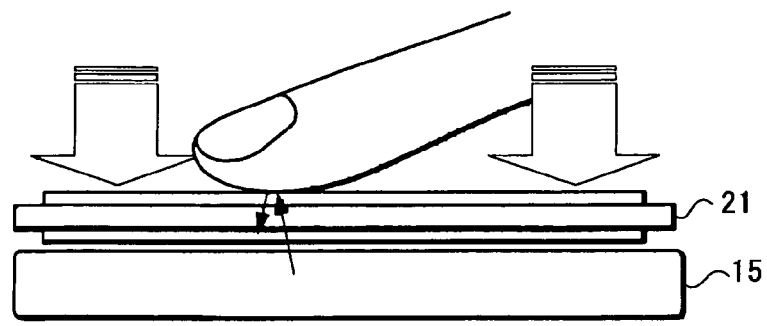
FIGS. 8A and 8B are explanatory diagrams showing an example of detection in a state of strong outside light according to the first embodiment of the present invention.
Figure 8B:
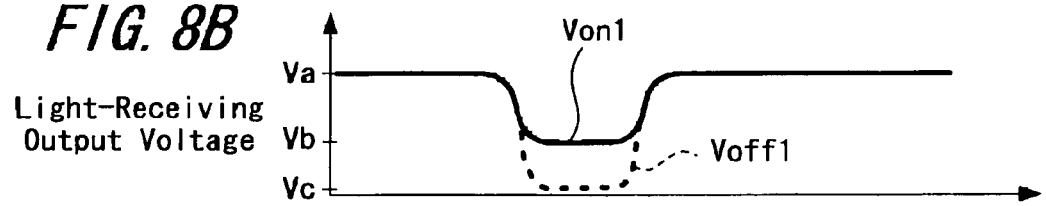
Figure 9A:
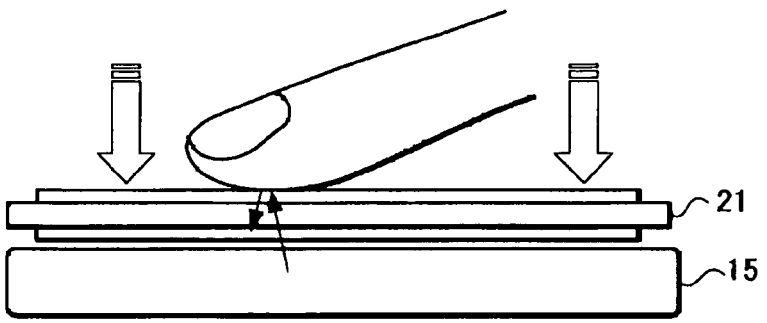
FIGS. 9A and 9B are explanatory diagrams showing an example of detection in a state of weak outside light according to the first embodiment of the present invention.
Figure 9B:
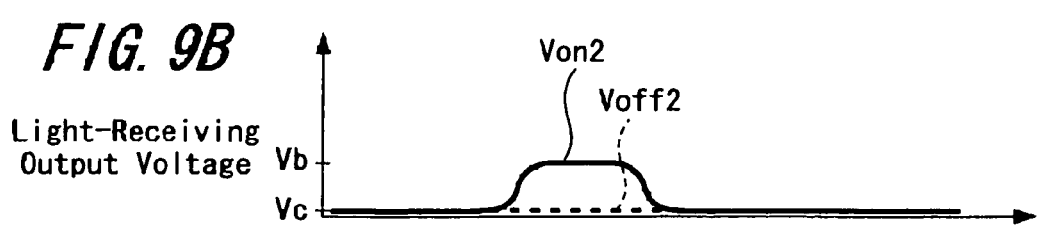

Here, with respect to processing of detecting the touch or approach in this embodiment, a principle that an object touched or approached to the display surface of the I/O display panel 20 is detected without being affected by the outside light is explained referring to FIGS. 8 and 9. FIGS. 8A and 8B show an example of the case in which outside light entering the display panel is strong (is stronger than light from backlight), where FIG. 8A shows the state in which the panel was touched with a finger in that state and FIG. 8B shows the change in a light-receiving output voltage in one line. FIGS. 9A and 9B show an example of the case in which almost no outside light enters the display panel, where FIG. 9A shows the state in which the panel was touched with a finger in that state and FIG. 9B shows the change in a light-receiving output voltage in one line.

In the case where the outside light entering the display panel is strong as shown in FIG. 8, a light-receiving voltage Von1 in the state where the backlight 15 is "ON" becomes a voltage Va corresponding to brightness of the outside light on the display surface other than the position touched with a finger, and the Von1 falls at the position touched with a finger to a voltage Vb corresponding to reflectivity with which light from the backlight is reflected on the surface of the object (finger) touched at that time. On the other hand, similarly a light-receiving voltage Voff1 in the state where the backlight 15 is "OFF" becomes a voltage Va corresponding to brightness of the outside light on the display surface other than the position touched with a finger, however, the Voff1 becomes a very low voltage Vc, because the position touched with a finger is in the state where the outside light is blocked.

Next, in the case where almost no outside light enters, as shown in FIG. 9, a light-receiving voltage Von2 in the state where the backlight 15 is "ON" becomes a very low voltage Vc on the display surface other than the position touched with a finger, because there is no outside light, and the Von2 rises at the position touched with a finger to a voltage Vb corresponding to reflectivity with which light from the backlight is reflected on the surface of the object (finger) touched at that time. On the other hand, a light-receiving voltage Voff2 in the state where the backlight 15 is "OFF" remains unchanged and is maintained as a considerably low voltage Vc both at the position touched with a finger and at the other area than that.

Hereupon, when comparing FIG. 8 and FIG. 9, it is understood that at the position not touched on the display area 21 of the panel the light-receiving voltage is greatly different between the case with outside light and the case without outside light. However, it is understood that at the position where the display area of the panel is touched with a finger the voltage Vb when the backlight is "ON" and the voltage Vc when the backlight is "OFF" become almost the same regardless of the presence or absence of outside light.

Accordingly, by detecting a difference between a voltage at the time when the backlight is "ON" and a voltage at the time when the backlight is "OFF", a position having a certain difference or more such as the difference between the voltages Vb and Vc can be determined as a position touched or approached. The processing of detection and determination shown in the above-described flow chart of FIG. 6 is a processing using this principle, and a touch can favorably be detected with the uniform condition either in the case where the outside light entering a panel is strong or in the case where almost no outside light enters. An approach to the panel that is the state close to the touch can also be detected.

Figure 10A:
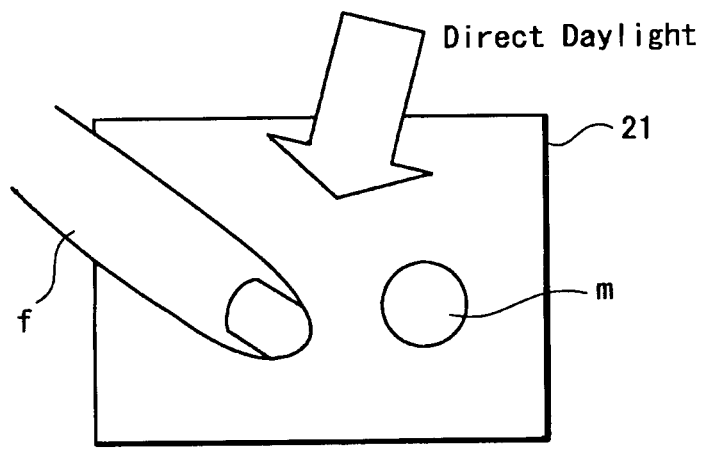
FIGS. 10A and 10B are explanatory diagrams showing an example of detection according to the first embodiment of the present invention.
Figure 10B:
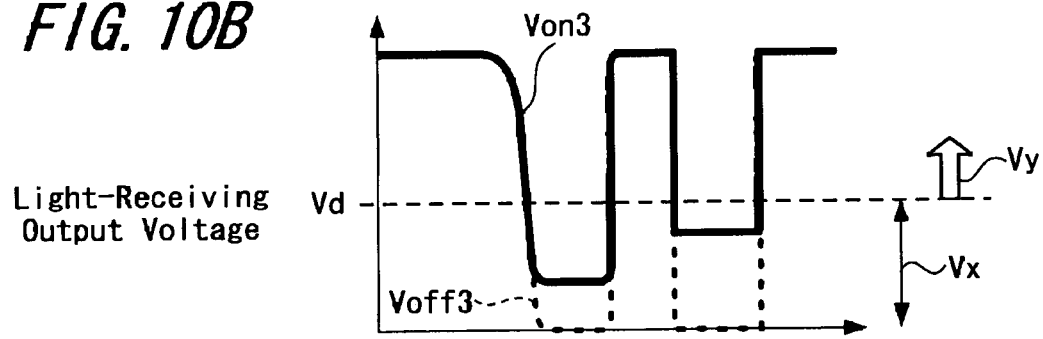

FIGS. 10A and 10B are diagrams explaining a dynamic range necessary for detecting the light-receiving voltage. FIG. 10A shows a state in which the display area 21 of the panel is touched, where the panel surface is being touched with a finger f and a circular object m having almost 100% reflectivity placed on the display area 21. In this state, the light-receiving voltage in the line that scans both the finger f and object m becomes the state shown in FIG. 10B. In FIG. 10B, a voltage Von3 is a light-receiving voltage in the state where the backlight is "ON" and a voltage Voff3 is a light-receiving voltage in the state where the backlight is "OFF".

As shown in FIG. 10B, voltage at a position where the object m of almost 100% reflectivity is placed, which is higher than a voltage Vd detected when the backlight is "ON" is a level Vy unnecessary to be observed, and the range Vx lower than that level is a dynamic range necessary for the detection. Signals of unnecessary observation level are made to overflow and are considered as the same strength.

As mentioned above, according to the I/O display panel of this embodiment, the state in which the display is touched or approached can favorably be detected with the uniform condition, regardless of the presence or absence of outside light. Further in this embodiment, since the processing that detects the difference in the light-receiving images of two times is performed, a fixed noise due to the uneven light-receiving characteristic of each pixel is removed simultaneously. It was confirmed in an experiment that capacity for removing the fixed noise was about 25 dB.

Further, in the principle of detecting a touch in this embodiment, since the reflected light of the light emitted from the display panel is detected at the position touched, the brightness of some level on the screen is needed to display the image regarding the position where the touch is detected. For example, a button to be pushed with a finger may need to be brightly displayed. Such display can be dealt with on the side of the application program that performs the display and detection of touch executed by the application program executing portion 11.

Furthermore, an area where the touch or approach is detected may be limited to a specific area in the display screen, and the area may be displayed brightly. In addition, in order to favorably detect the touch and the like irrespective of the brightness of the image displayed, infrared light may be configured as the light emitted from the backlight other than the visible light for image illumination and the infrared light is transmitted through the panel 20 with a constant brightness, and reflected light of the infrared light may be detected.

Moreover, although the processing that detects only one position where the I/O display panel was touched (or approached) was explained in the above explanation, the detection processing of this embodiment is also applied to simultaneous detection of a plurality of positions touched (or approached), in the case where the plurality of positions on the panel were touched (or approached) simultaneously. The simultaneous detection of the plurality of positions touched (or approached) can be performed by the processing of discriminating the light-receiving signal obtained from the panel.

Figure 11:
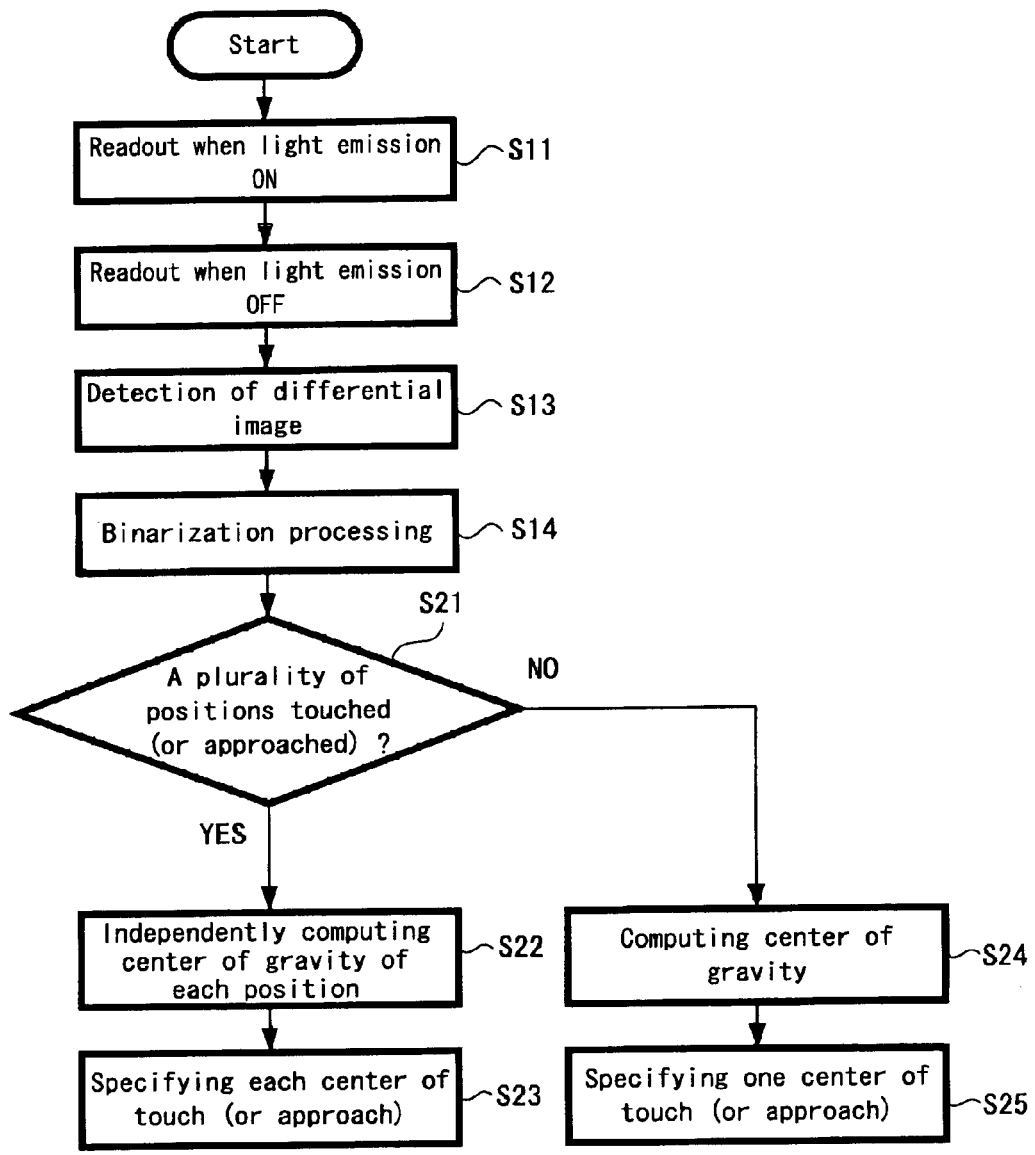
FIG. 11 is a flow chart showing an example of processing of determining a plurality of positions touched or approached according to the first embodiment of the present invention.

A flow chart of FIG. 11 shows an example of the processing of such case. Readout is executed in the state where the light emission (backlight) is "ON" (step S11) and the readout is also executed in the state where the light emission (backlight) is "OFF" (step S12). Then, processing of detecting a difference in the two light-receiving signals is performed for each pixel in the light-receiving circuit 13 (step S13), and processing of making a differential image binarized into a predetermined level or more and less than the predetermined level is performed for each pixel (step S14).

Figure 6:
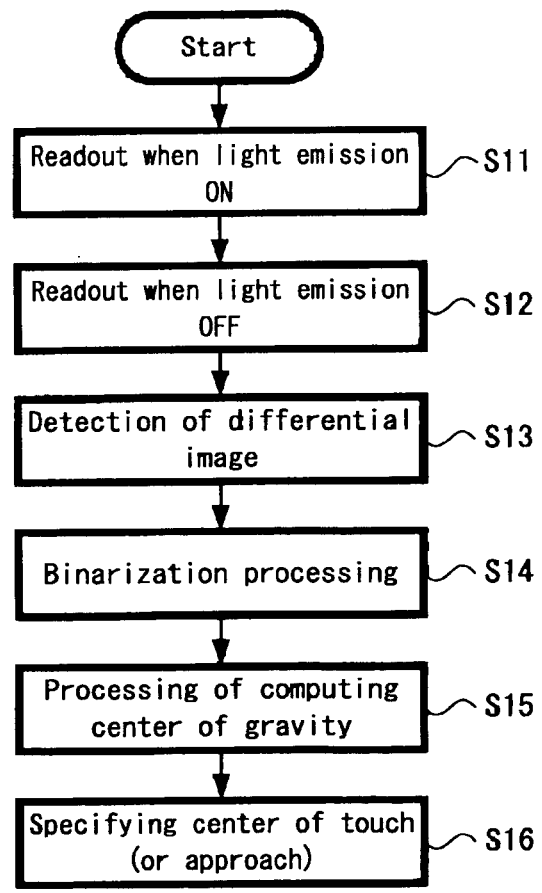
FIG. 6 is a flow chart showing an example of processing of specifying a position touched or approached according to the first embodiment of the present invention.

Processing up to this point is the same as the example shown in FIG. 6, but further in this embodiment, it is judged whether or not a plurality of positions are touched (or approached) (step S21). As the judgment here, for example, if a plurality of areas, where touch was detected respectively, of a certain area or larger are independently detected, it is judged that a plurality of positions are touched.

With this judgment, if it is judged that there are a plurality of positions detected, a center of gravity of each position is calculated (step S22), and a coordinate position of the center of gravity respectively determined (coordinate position in the display area 21) is sent to the application program executing portion 11. In the application program executing portion 11, the supplied coordinate position of each center of gravity is specified as a center position of the object touched or approached (step S23).

Further, in the step S21, if it is judged that one position is touched, computation processing of determining a center of gravity of that position is performed (step S24) and the coordinate position of the center of gravity determined (coordinate position in the display area 21) is sent to the application program executing portion 11. In the application program executing portion 11, the supplied coordinate position of the center of gravity is specified as a center position of the object touched or approached (step S25).

Figure 12A:
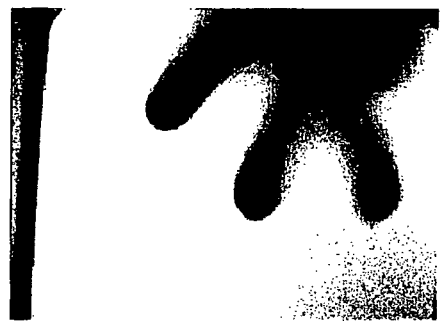
FIGS. 12A to 12D are explanatory diagrams showing an example of the detected images according to the first embodiment of the present invention.
Figure 12B:
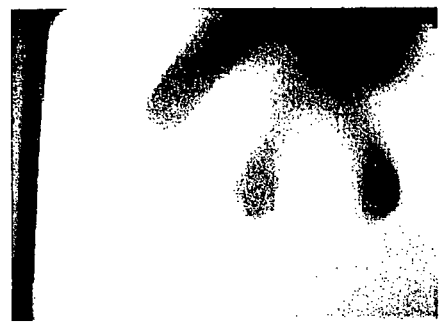
Figure 12C:
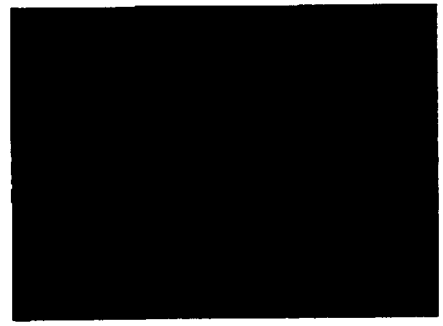
Figure 12D:

FIGS. 12A to 12D show an example of an actual image in the case where the touches to a plurality of positions are detected as described above. FIGS. 12A to 12D show an example of the image in the case where the display surface of the I/O display panel 20 is touched with three fingers. FIG. 12A is an image based on a quantity of received light read out in the state where the light emission is "ON" and FIG. 12B is an image based on a quantity of received light read out in the state where the light emission is "OFF". FIG. 12C shows an image based on the difference in these two images. Further, FIG. 12D shows the binarized image thereof. As shown in FIG. 12D, when binarized, the positions touched with three fingers become independent areas, and by detecting each center of gravity, the operation and the like that correspond to a displayed button touched with each finger can be performed. Simultaneous detection of touch to a plurality of positions as described above has been theoretically difficult with a touch panel of the past.

As the processing of detecting touch or approach in the above-described embodiments, the processing of specifying the center position such as the center of gravity of the range touched was performed, however, instead of processing data on the coordinates of such position touched, the image data showing the range touched may be obtained to be used in various applications. The corresponding processing may be performed with an application program installed in the application program executing portion 11.

Figure 13:
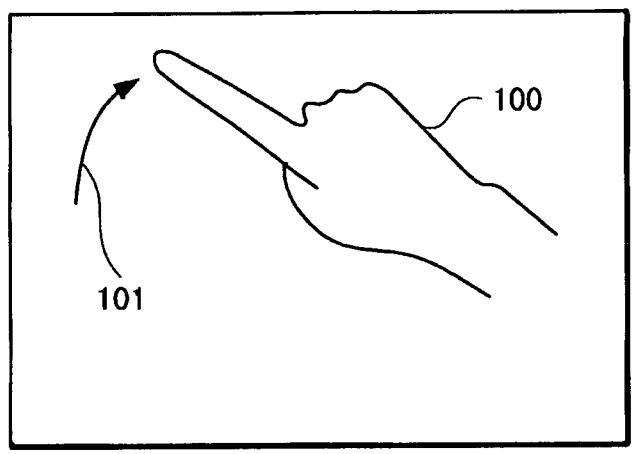
FIG. 13 is an explanatory diagram showing an example of detection according to the first embodiment of the present invention.

FIG. 13 shows an example in which a surface of a display panel is touched with a hand 100 and a trajectory of the position touched is displayed on the screen as a drawing line 101.

Figure 14:
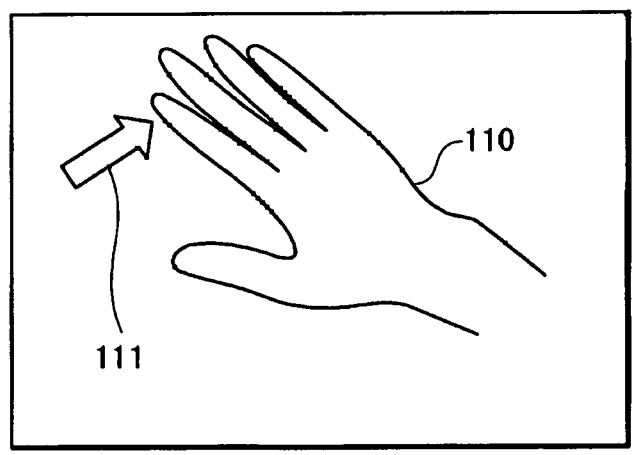
FIG. 14 is an explanatory diagram showing an example of detection according to the first embodiment of the present invention.

FIG. 14 shows an example of gesture recognition using a hand shape. In this example, the shape of a hand 110 touched (or approached) to a display panel is recognized, and the hand shape recognized is displayed as an image and then with a display object move 111, some processing is performed.

Figure 15:
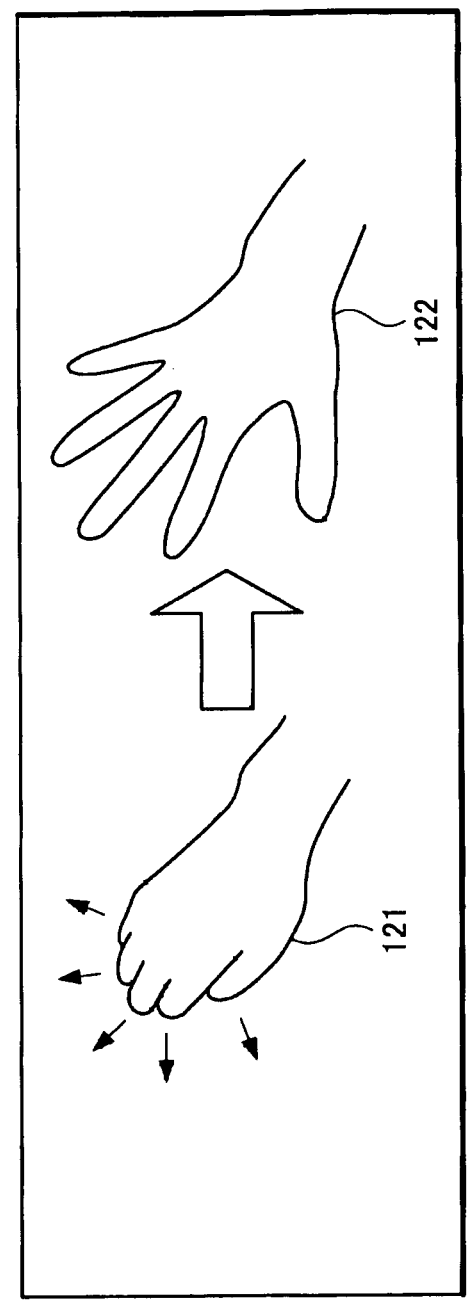
FIG. 15 is an explanatory diagram showing an example of detection according to the first embodiment of the present invention.

FIG. 15 shows an example in which a hand closed 121 is changed to a hand opened 122 and the touch or approach of the hand (121, 122) in each condition is recognized as an image on the display panel and the processing based on the image-recognition is executed.

With the processing being performed based on those recognitions, an instruction to zoom in can be given, for example. Since such instruction can be given, the I/O display panel 20 of this embodiment, for example, may be connected to a personal computer apparatus and an operation of changing a command on the computer apparatus can be input in more natural ways with those image-recognitions.

Figure 16:
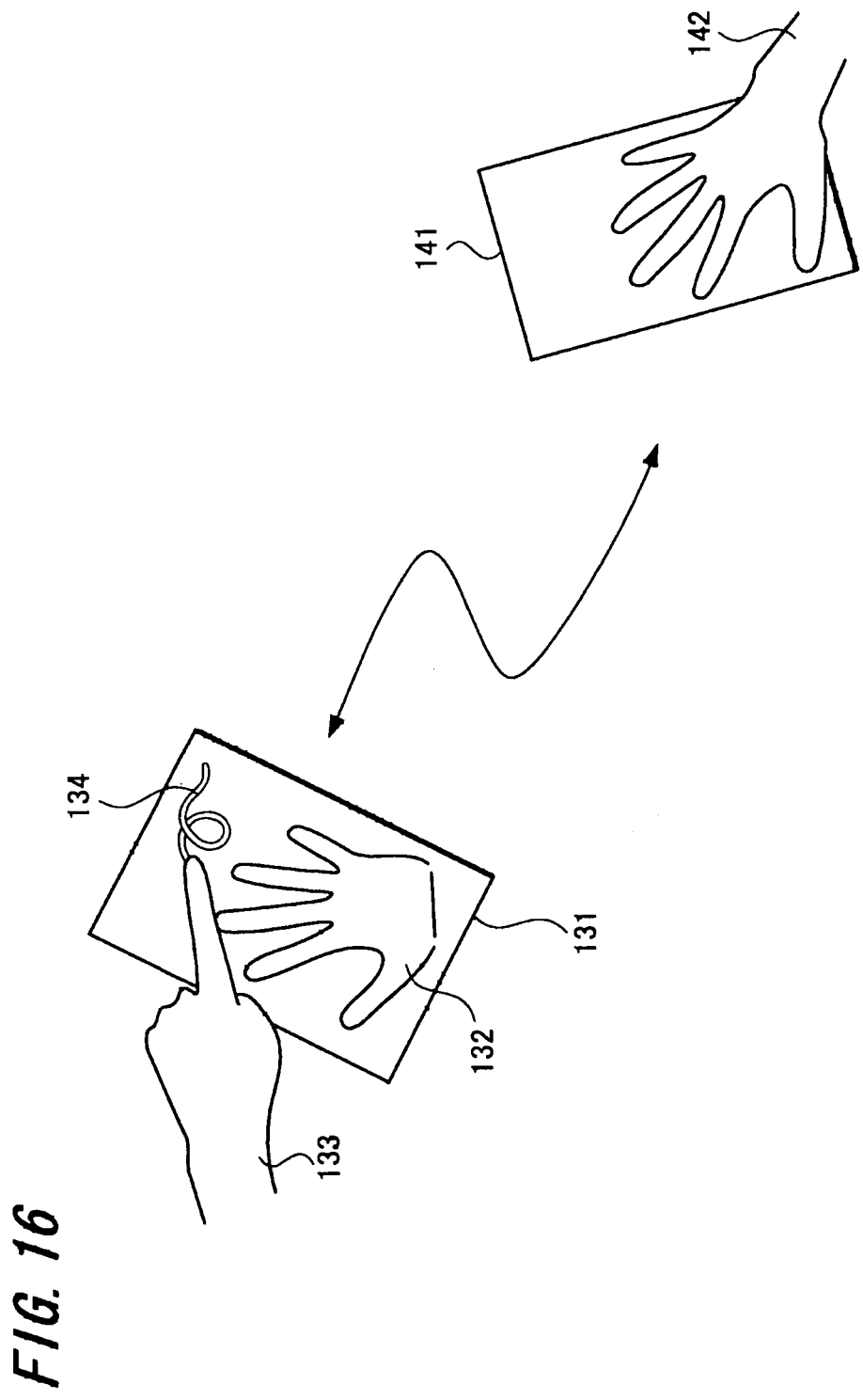
FIG. 16 is an explanatory diagram showing an example of detection and transmission according to the first embodiment of the present invention.

Further, as shown in FIG. 16, for example, a plurality of I/O display panels of this embodiment are prepared and are connected using some transmission means, and an image of the touch or approach detected is sent to another I/O display panel to communicate between users operating respective display panels. Specifically, as shown in FIG. 16, two I/O display panels 131 and 141 are prepared and a hand shape whose image is recognized on the panel 141 is transmitted to the other panel, and processing of displaying a hand shape 132 on the other panel 131, or transmitting a trajectory 134 displayed after the panel 131 being touched by a hand 133 to the other panel 141 to be displayed becomes possible. In this way, since the drawing state is sent as a moving image and handwritten characters, graphics and the like are sent to another panel, there is a possibility of a new communication tool. For example, the I/O display panel of this embodiment is assumed to be applied to a display panel of a mobile phone unit and the like.

Figure 17:
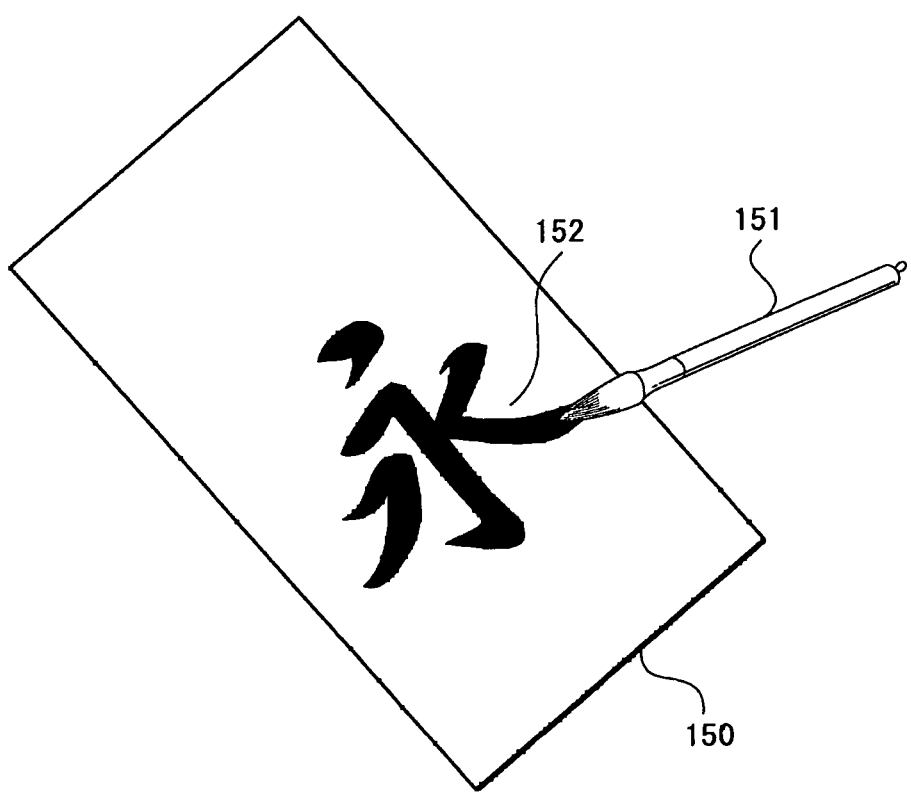
FIG. 17 is an explanatory diagram showing an example of detection according to the first embodiment of the present invention.

Furthermore, since such detection of touch as this embodiment is possible, a handwriting input using a writing brush becomes possible, as shown in FIG. 17 for example, where a brush 151 is used to touch the surface of an I/O display panel 150 so that a character may be written, and a position touched with the brush 151 is displayed on a panel 150 as an image 152. In this case, a sensitive touch of the writing brush can be recognized and obtained. Although in the past the handwriting is recognized in some digitizer by obtaining an inclination of a specific pen with detecting the electric field for example, information can be input with more realistic sense by detecting the touching surface of a real writing brush itself, according to this embodiment.

Next, a second embodiment of the present invention is explained with reference to FIGS. 18 through 20. Although in the above-described first embodiment the present invention is applied to an LCD display, in this embodiment the present invention is applied to an organic EL display. Although in the case of an LCD display a backlight was needed as light-emitting means separately from the display pixels, a configuration and processing is partly changed in the case of an organic EL display in comparison with the first embodiment, because elements constituting the pixels emit light; and therefore such change is mainly explained in this embodiment and the processing of a light-receiving signal detected, the applications used and the like are omitted, because those are the same as the first embodiment.

Figure 18:
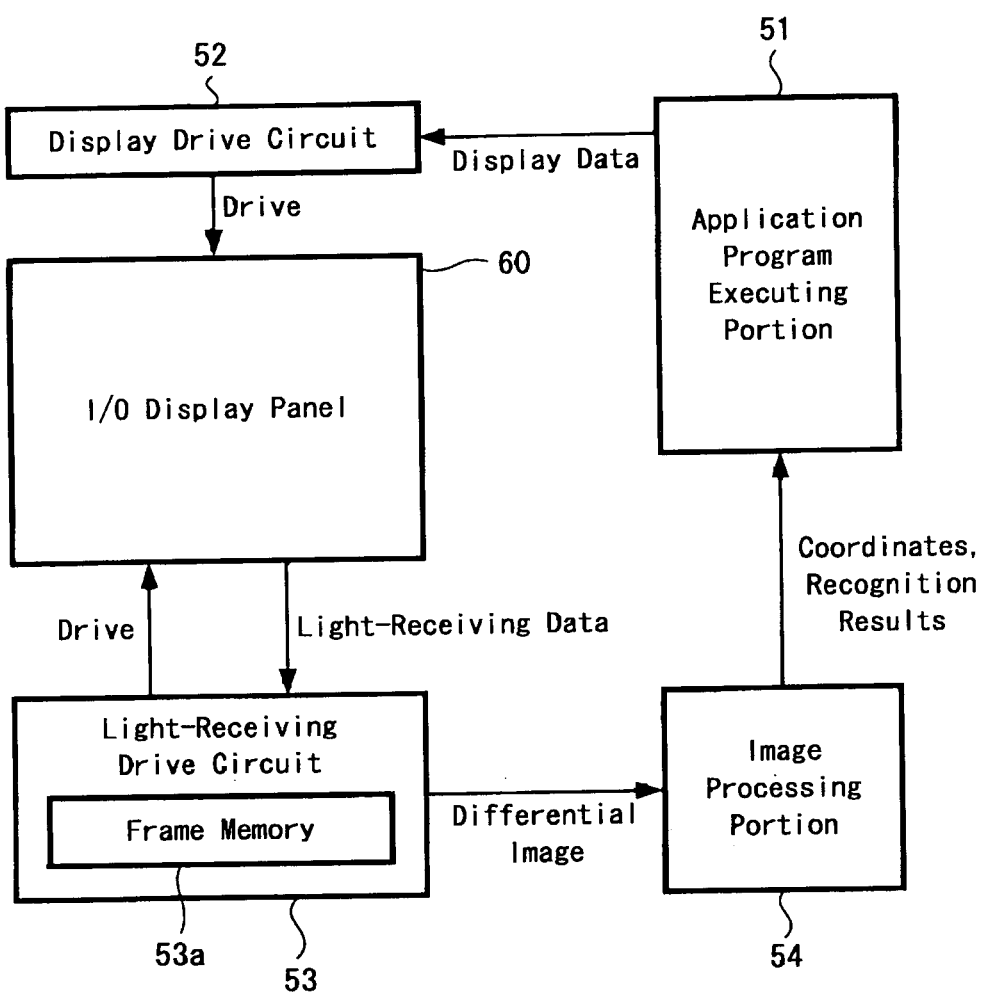
FIG. 18 is a block diagram showing an example of a configuration of a display device according to a second embodiment of the present invention.

FIG. 18 is a block diagram showing an example of a configuration of a display device of this embodiment. An application program executing portion 51 performs processing of displaying an image corresponding to the application being executed therein, and detects a touch to a display panel and performs processing corresponding to a display position touched. An instruction from the application program executing portion 51 to display an image is sent to a display drive circuit 52, and the drive to display the image on an I/O display panel 60 is performed.

An organic EL display is configured as the I/O display panel 60, in which a plurality of pixels (display elements) are formed in a matrix shape in a display area (sensor area) and the display elements also function as the light-emitting elements, and a light-emitting period and a light-receiving period is set by time division. Further, signal electric charge stored correspondingly to the quantity of light received during the light-receiving period is read out by the drive from a light-receiving drive circuit 53. The light-receiving drive circuit 53 includes inside a frame memory 53a to be used for determination processing (processing of detecting the difference) necessary when the light-receiving signal is read out.

The light-receiving signal (differential image signal) read out in the light-receiving drive circuit 53 and determined is sent to an image processing portion 54 and the state of touch and the like are determined as an image, a coordinate position of the center of the touch and the like are determined if necessary, and the results of determination (coordinates data, recognition results and the like) are sent to the application program executing portion 51. In the application program executing portion 51, the processing corresponding to the application being in execution is performed. For example, the processing of displaying in the displayed image a position, range and the like where the touch was detected is performed.

Figure 19:
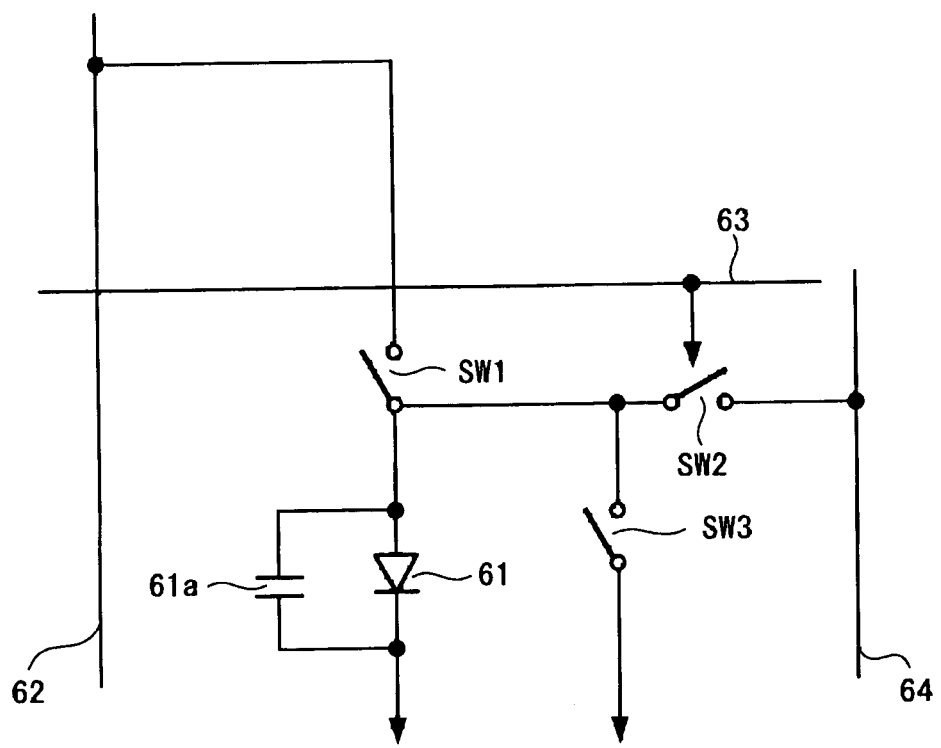
FIG. 19 is a connection diagram showing an example of a configuration of a pixel according to the second embodiment of the present invention.

FIG. 19 shows a configuration of one pixel. Here, a light-emitting element 61 of the organic EL display is shown as a light-emitting diode, where a parasitic capacitance 61a is generated. In order to display an image, display data is supplied to the light-emitting element 61 from a display data signal wire 62 through a switch SW1. Therefore, the display period (light-emitting period) is set as a period when the switch SW1 is ON.

Then, during a period when no light is emitted in the light emitting element 61, electric charge is stored in the parasitic capacitance 61a generated in the light-emitting element 61, correspondingly to the quantity of light entering the display panel surface. The stored electric charge is read out to a receiving data signal wire 64 when a switch SW2 is ON. In addition, at the time of the start of the light-receiving period, the electric charge stored in the parasitic capacitance 61a at the time of the light-emitting is discharged by turning ON a reset switch SW3 for a moment. The "ON" of the switch SW2 is controlled by the signal obtained in a readout line selecting wire 63.

FIGS. 20A through 20D show an example of the case in which the processing that detects a touch or approach to the panel 60 is performed while displaying an image and the like in an I/O display panel 60 of the above-described organic EL display type.

FIG. 20A shows a state of the I/O display panel 60, and here shows the state of a surface of the panel 60 being touched with a finger f. Further, in the state shown in FIG. 20A, a light-emitting area 60a includes a plurality of specific horizontal lines in one screen. Since the light-emitting area 60a is changed in one field period though no light is emitted from the light-emitting area 60a, the whole screen seems to be displayed by an afterimage effect for a person who is watching this screen. FIG. 20A shows the state where the horizontal line of the light-emitting area 60a is changed downward from the top to bottom.

In this state, the readout of the light-receiving signal is performed two times, namely, the horizontal line readout 60b on the upper side adjacently to the light-emitting area 60a and the horizontal line readout 60c with a certain interval from that readout 60b are performed in one field period. The lines, where the readout 60b, 60c are performed, are changed sequentially in synchronization with the change of the light-emitting area 60a.

When performing the readout in this way, readout of the horizontal line 60b adjacent to the light-emitting area 60a becomes the one that can detect light reflected from the light-emitting area 60a and, as shown in FIG. 20B, becomes the readout data at the time when the light emission is ON. Then, the readout of the horizontal line 60c that is away from the light-emitting area 60a becomes the one without an influence of the light-emitting and, as shown in FIG. 20C, becomes the readout data when the light emission is OFF. Therefore, when detecting a difference between both readout data as shown in FIG. 20D, the difference between the light-receiving data when the light emission is ON and the light-receiving data when the light emission is OFF is detected, and further with processing of binarizing difference in the image data and the like, influence of outside light, deterioration of sensitivity according to the unevenness of the characteristics of the elements constituting the pixels are removed and the touch or approach can be detected favorably, similarly to the first embodiment described above.

As described above, the present invention can also be applied to the case in which the display elements constituting a pixel are the light-emitting elements such as those in an organic EL display, and accordingly the present invention can be applied to both the case in which another light-emitting means different from a display panel is required, for example, in an LCD display and the case in which a display panel itself emits light. In the embodiments described above, an LCD display and organic EL display, for example, were explained as display panels respectively, however, the present invention can be applied to a display of another configuration if it is a display capable of incorporating the light-receiving elements.

It should be understood by those skilled in the art that various modifications, combinations, sub-combinations and alterations may occur depending on design requirements and other factors insofar as they are within the scope of the appended claims or the equivalents thereof.

What is claimed is:

1. A display device that displays an image and receives light simultaneously or alternately, comprising:
    a plurality of display elements which emit light and display an image;
    a plurality of light-receiving elements which receive light entering a display surface of said display device;
    said light-receiving elements receive light two times in generating information indicating whether at least one region corresponding to specific light receiving elements are covered or approached, once during a light-emitting state of the display device and once during a state where light is not emitted by the display device; and
    wherein a determination regarding whether the at least one region corresponding to the specific light receiving elements are covered or approached is based on a difference in amount of received light of said two times and further wherein the difference in amount of received light is analyzed across the region in order to determine if two or more regions of the display are simultaneously covered or approached, and wherein a center of gravity for each position is determined if it is determined that the two or more regions of the display are simultaneously covered or approached and wherein a frame memory stores light reception information from the display device and differential image data derived from the frame memory is provided to image processing circuitry for determining the two or more regions of the display that are covered or approached.

2. The display device according to claim 1, further comprising:
    a backlight provided separately from said display elements, which provides illumination from a backside.

3. The display device according to claim 1, wherein a value of difference in the quantities of received light of said two times is binarized to detect a position touched or approached on the display surface.

4. The display device according to claim 1,
    wherein a range touched or approached on the display surface is detected based on the difference in the quantities of received light of said two times, and a center of gravity of the detected range is determined as a center of the position touched or approached.

5. The display device according to claim 1,
    wherein the position or range where the touch or approach to said display surface has been detected is displayed by said display elements as an image.

6. A method of displaying an image and receiving light simultaneously or alternately on a display surface of a display device, comprising:
- emitting light and displaying the image by a plurality of display elements;
- receiving light entering the display surface by a plurality of light-receiving elements;
- executing display processing for making said display surface emit light to display the image;
- executing light-receiving processing two times in generating information indicating whether at least one region corresponding to specific light-receiving elements are covered or approached, once during a state where light-emitting for the display device is performed and once during a state where light is not emitted from the display device; and
- wherein a determination regarding whether the at least one region corresponding to specific light receiving elements are covered or approached is based on a difference in amount of received light of said two times, and further wherein the difference in amount of received light is analyzed across the region in order to determine if two or more regions of the display are simultaneously covered or approached, and wherein a center of gravity for each position is determined if it is determined that the two or more regions of the display are simultaneously covered or approached and wherein a frame memory stores light reception information from the display device and differential image data derived from the frame memory is provided to image processing circuitry for determining the two or more regions of the display that are covered or approached.

* * * * *